US006457046B1

United States Patent
Munakata

(10) Patent No.: US 6,457,046 B1
(45) Date of Patent: *Sep. 24, 2002

(54) INFORMATION PROVIDING APPARATUS FOR SERVER AND COMPUTER-READABLE RECORDING MEDIUM STORING INFORMATION PROVIDING PROGRAM FOR SERVER

(75) Inventor: Hidemi Munakata, Sapporo (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/000,883

(22) Filed: Dec. 30, 1997

(30) Foreign Application Priority Data

Jun. 26, 1997 (JP) .............................. 9-170013

(51) Int. Cl.⁷ .............................. G06F 15/16
(52) U.S. Cl. ...................... 709/216; 709/221
(58) Field of Search .......................... 345/338; 709/300, 709/221, 224, 223, 200, 203, 211, 212, 216, 217, 219, 225, 229, 227, 213; 413/201, 202

(56) References Cited

U.S. PATENT DOCUMENTS

| | | | | | |
|---|---|---|---|---|---|
| 5,301,326 A | * | 4/1994 | Linnett et al. | ............... | 709/300 |
| 5,535,323 A | * | 7/1996 | Miller et al. | ................. | 709/224 |
| 5,553,239 A | * | 9/1996 | Heath et al. | ................. | 713/201 |
| 5,675,798 A | * | 10/1997 | Chang | .......................... | 709/224 |

(List continued on next page.)

FOREIGN PATENT DOCUMENTS

WO    97 17662    5/1997

OTHER PUBLICATIONS

S. Narayanaswamy, et al., "A Low–Power, Lightweight Unit to Provide Ubiquitous Information Access Application and Network Support For Infopad," IEEE Personal Communications, vol. 3, No. 2, 1996, pp. 4–17.

EPO Search Report dated Sep. 28, 1999 from corresponding EP Application No. 98 30 1113.

Patent Abstracts of Japan, Publication No. 9–006662, (Jan. 10, 1997).

Primary Examiner—Mark H. Rinehart
Assistant Examiner—Marc D. Thompson
(74) Attorney, Agent, or Firm—Staas & Halsey LLP

(57) ABSTRACT

An information providing apparatus for a server is capable of allowing terminals with no large-capacity memory to store and use a large amount of information and also of permitting users to use application programs individually. The information providing apparatus has a user's individual information memory for storing therein user's individual information in areas assigned to respective users. The user's individual information is stored into the user's individual information memory by a contents storage unit. The user's individual information can be processed by a contents customizing unit, and managing information which allows users to manage the user's individual information with ease is added to the user's individual information by a managing information manipulating unit. A pattern memory stores pattern application programs, which can be processed and stored by the contents customizing unit for use as user's individual programs. A contents usage control unit reads stored programs, copies the read programs to a displayable/executable area managed by the server, and then executes the programs.

9 Claims, 19 Drawing Sheets

U.S. PATENT DOCUMENTS

| | | | | |
|---|---|---|---|---|
| 5,740,430 A | * | 4/1998 | Rosenberg et al. | |
| 5,796,952 A | * | 8/1998 | Davis et al. | 709/224 |
| 5,812,776 A | * | 9/1998 | Gifford | 709/217 |
| 5,835,724 A | * | 11/1998 | Smith | 709/227 |
| 5,878,223 A | * | 3/1999 | Becker et al. | 709/223 |
| 5,892,905 A | * | 4/1999 | Brandt et al. | 713/201 |
| 5,951,694 A | * | 9/1999 | Choquier et al. | 709/203 |
| 5,974,446 A | * | 10/1999 | Sonnenreich et al | 709/203 |
| 6,016,509 A | * | 1/2000 | Dedrick | 709/224 |
| 6,026,452 A | * | 2/2000 | Pitts | 709/203 |
| 6,029,196 A | * | 2/2000 | Lenz | 709/203 |
| 6,098,096 A | * | 8/2000 | Tsirigotis et al. | 709/213 |
| 6,115,742 A | * | 8/2000 | Franklin et al. | 709/224 |
| 6,151,643 A | * | 11/2000 | Cheng et al. | 710/36 |
| 6,230,202 B1 | * | 5/2001 | Lewine | 709/229 |
| 6,233,634 B1 | * | 5/2001 | Clark et al. | 710/126 |

* cited by examiner

70

AIRPLANE SEAT AVAILABILITY
SEARCH (PATTERN)

DATE — 71a
TIME — 71b
ORIGIN — 71c
DESTINATION — 71d
AIRLINE — 71e
NONSMOKING SEAT — 71f
SEAT TYPE — 71g

72 — SEARCH   CANCEL — 73

74

| NUMBER | AIRLINE | DEPARTURE/ARRIVAL TIME | FLIGHT NO. |
|---|---|---|---|
|  |  |  |  |
|  |  |  |  |
|  |  |  |  |
|  |  |  |  |
|  |  |  |  |
|  |  |  |  |

FIG. 6

| ID ~81 | PWD ~82 | SID ~83 | DATA TYPE ~84 | SERIAL NUMBER ~85 | DIS-CLOSURE FLAG ~86 | DIR1 ~87a | DIR2 ~87b | DIR3 ~87c | CONTENTS ~88 |
|---|---|---|---|---|---|---|---|---|---|
| 1234 | **** | HP | SRC | 1 | 1 | | | | (HTML SOURCE) |
| 1234 | **** | APP | SRC | 1 | 3 | APP1 | | | (PROGRAM SOURCE) |
| 1234 | **** | APP | SRC | 2 | 3 | APP1 | | | (PROGRAM SOURCE) |
| 1234 | **** | APP | DAT | 1 | 3 | APP1 | DAT1 | | (DATA) |

FIG. 7

| ID | PWD | SID | DATA TYPE | SERIAL NUMBER | DIS-CLOSURE FLAG | DIR1 | DIR2 | DIR3 | CONTENTS |
|---|---|---|---|---|---|---|---|---|---|
| A | **** | HP | SRC | 1 | 1 | × | | | (HTML SOURCE) |

FIG. 10

| ID | PWD | SID | DATA TYPE | SERIAL NUMBER | DIS-CLOSURE FLAG | DIR1 | DIR2 | DIR3 | CONTENTS |
|---|---|---|---|---|---|---|---|---|---|
| A | **** | APP | SRC | 1 | 3 | | | | (PROGRAM SOURCE) |

FIG. 13

| ID | PWD | SID | DATA TYPE | SERIAL NUMBER | DIS-CLOSURE FLAG | DIR1 | DIR2 | DIR3 | CONTENTS |
|---|---|---|---|---|---|---|---|---|---|
| A | **** | HP | SRC | 1 | 3 | X | | | (HTML SOURCE) |
| A | **** | HP | SRC | 2 | 1 | X | Y | | (HTML SOURCE) |
| B | **** | HP | SRC | 1 | 2 | | | | (HTML SOURCE) |
| C | **** | HP | SRC | 1 | 1 | | | | (HTML SOURCE) |

FIG. 14

| ID 81 | PWD 82 | SID 83 | DATA TYPE 84 | SERIAL NUMBER 85 | DIS-CLOSURE FLAG 86 | DIR1 87a | DIR2 87b | DIR3 87c | CONTENTS 88 |
|---|---|---|---|---|---|---|---|---|---|
| A | **** | APP | SRC | 1 | 3 | | | | (PROGRAM SOURCE) |
| A | **** | APP | DAT | 1 | 3 | | | | 1,1,1,52500 |

FIG. 18

INFORMATION PROVIDING APPARATUS FOR SERVER AND COMPUTER-READABLE RECORDING MEDIUM STORING INFORMATION PROVIDING PROGRAM FOR SERVER

BACKGROUND OF THE INVENTION (1) Field of the Invention

The present invention relates to an information providing apparatus for a server, and more particularly to an information providing apparatus for holding information that users can individually use, on a WWW (World Wide Web) server which provides information on the Internet, so that the users do not need external mass storage mediums such as hard disks at their terminals.

(2) Description of the Related Art

Recent years have seen the advent of small portable information terminals with a communications capability, which provides an environment allowing the user to gain access to the Internet and intranets from any places at any times. Some of the small portable information terminals carry information browsing software known as a browser for the user to view various items of information that are offered through the Internet.

Services for offering information on the Internet include the pull-type service and the push-type service. The pull-type service is a generally used service for the user to access a server from their terminal and pulls necessary information from the server. Since the user cannot obtain desired information unless they access a server, if a source of information at the server frequently updates the information, then the user finds it necessary to access the server frequently in order to obtain the latest information. The push-type service does not require the user to obtain information, but automatically delivers the latest information to the user, thus eliminating the trouble which the user would otherwise take with the pull-type service that needs frequent access to the server. With the push-type service, the browser at a user's terminal incorporates a channel function for controlling the push-type service, and the user registers in advance the address of a desired server as a channel in the browser. The browser checks the server at predetermined intervals of time to see if there are new contents at the server or not. If there are new contents at the server, then the browser automatically downloads the information from the server into the terminal.

Servers that operate on the Internet have application programs for offering information. Many of those application programs are stored in a hierarchical array of directories set up in a memory of the server. For executing such an application program, it is necessary to place executable files of the application program in certain directories indicated by the server. Generally, there are available two types of such directories. One directory type stores files for displaying static pages with no motion to display contents of such pages. The other directory type stores files for displaying dynamic pages with motion to execute programs. The server permits only files placed in those directories to display contents or execute programs.

According to one scheme of the pull-type service, the user specifies certain conditions, and the server generates and sends back information that complies with the conditions. The generated information occasionally becomes so large that the terminal needs corresponding storage capacity and time in order to download the information. According to the push-type service, terminals require a special program for registering channels and automatically downloading latest information and a large-capacity memory for storing downloaded information. Inasmuch as individual terminals have respective user-dependent usage environments, there are certain limitations on use of different terminals by each user. Portable information terminals find it difficult to store information and use stored information because they do not have a large-capacity memory or an external storage medium such as a hard disk.

Application programs at servers are managed by directories. Therefore, each time an application program is added at a server, the supervisor of the server needs to manually generate a directory and install the program. As the number of application programs to be added increases, the manual work that should be performed by server supervisor becomes considerably complex. For this reason, servers can provide only application programs that can be used by all users, but not application programs that are specific to individual users.

SUMMARY OF THE INVENTION

It is an object of the present invention to provide an information providing apparatus for a server, which is capable of allowing portable information terminals with no large-capacity memory and no external storage medium to store and use a large amount of information, and of holding application programs specific to individual users without causing the server supervisor any trouble, and a computer-readable recording medium which stores an information providing program for the server.

To achieve the above object, there is provided in accordance with the present invention an information providing apparatus for a server connected through a network to a plurality of users. The information providing apparatus includes user's individual information memory means for storing therein user's individual information in areas assigned respectively to the users, contents storage means for storing information to into the user's individual information memory means, and contents usage control means for reading the information stored in the user's individual information memory means and using the read information.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 6 is a diagram showing an executed example of an original agent program;

FIG. 7 is a diagram of the data structure of a user file;

FIG. 10 is a diagram of an example of a home page registered in a database;

FIG. 13 is a diagram of an example of an original application registered in the database;

FIG. 14 is a diagram of an example of home pages registered in the database;

FIG. 18 is a diagram of an example of new data registered in the database; and

DETAILED DESCRIPTION OF THE PREFERRED EMBODIMENTS

Figure 1:
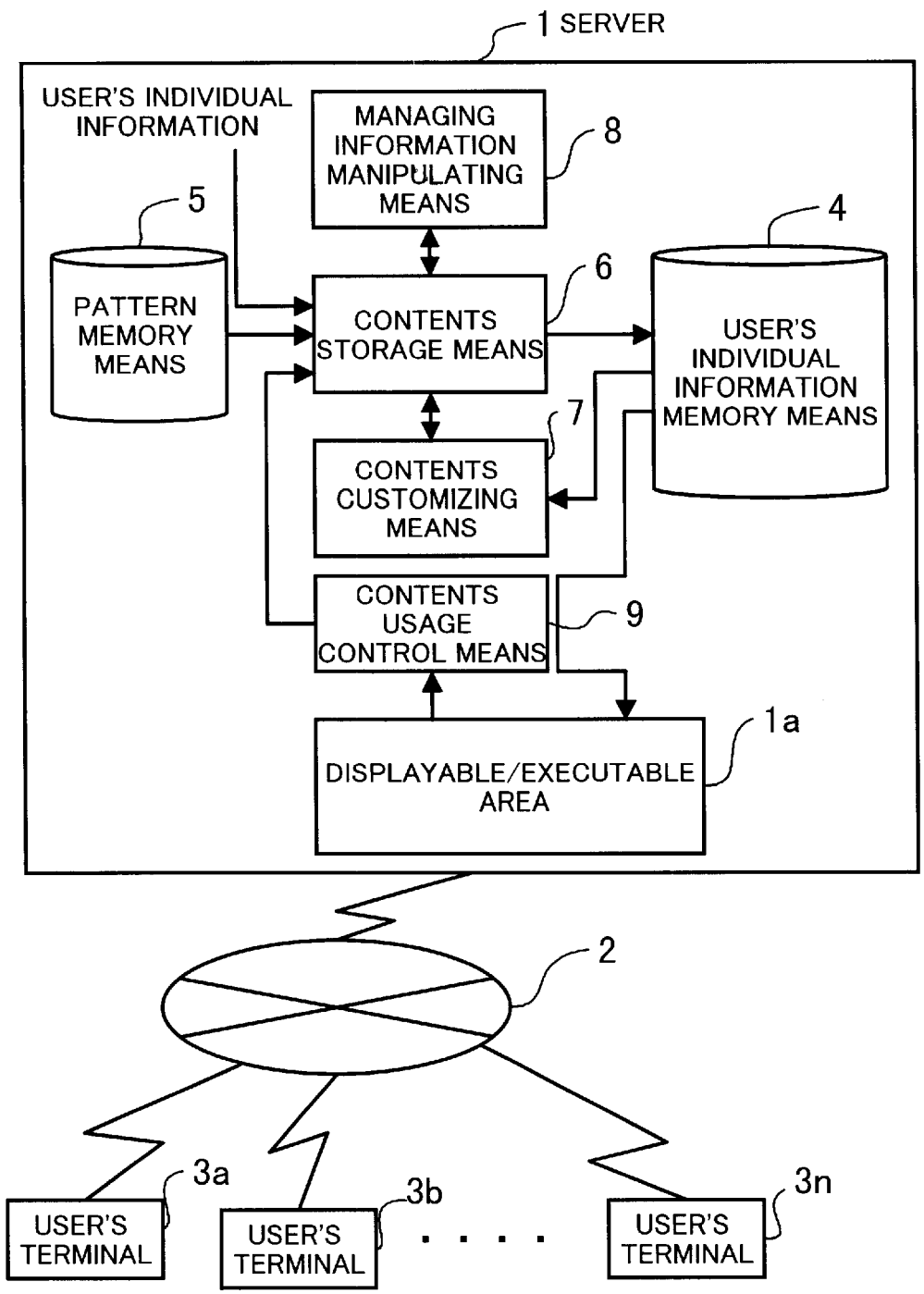
FIG. 1 is a block diagram illustrative of the principles of an information providing apparatus for a server according to the present invention.

FIG. 1 shows the principles of an information providing apparatus for a server according to the present invention. As shown in FIG. 1, a server 1 is connected to a plurality of user's terminals $3a, 3b, \ldots, 3n$ through a network 2. The server 1 comprises a user's individual information memory means 4, a pattern memory means 5, a contents storage means 6, a contents customizing means 7, a managing information manipulating means 8, and a contents usage control means 9. The server 1 also has a displayable/executable area $1a$ under its own control.

The user's individual information memory means 4 stores therein user's individual information as contents in areas assigned respectively to the users. These areas of the user's individual information memory means 4 serve as external memory devices of the user's terminals $3a, 3b, \ldots, 3n$. The user's individual information that can be stored by the user's individual information memory means 4 includes information provided by the server 1, application programs that can individually be used by the users, and information obtained from other servers which perform information providing services.

The pattern memory means 5 stores therein patterns of application programs that can individually be used by the users, and the patterns are prepared by the server. Applications that are stored in the pattern memory means 5 are files that are referred to only.

The contents storage means 6 stores, into the user's individual information memory means 4, patterns of application programs which the users want to use, obtained user's individual information, and information generated when application programs are executed.

The contents customizing means 7 customizes, according to the preference of users, patterns of application programs read from the pattern memory means 5 and application programs stored in the user's individual information memory means 4.

The managing information manipulating means 8 manipulates managing information for each user's individual information so that each user can manage, by themselves, the user's individual information stored in the user's individual information memory means 4.

The contents usage control means 9 functions when the user's individual information stored in the user's individual information memory means 4 is to be used. When there is a request to use an application program from a user's terminal, for example, the contents usage control means 9 places the application program into the displayable/executable area $1a$ managed by the server 1, SO that the application program will operate as an application program of the server 1 though it is user's individual information.

The user's individual information memory means 4 serve as part of the storage areas of the user's terminals $3a, 3b, \ldots, 3n$, and can individually be used by the users. Any terminals which have a general browser can access the server 1 for using user's individual information stored in the user's individual information memory means 4. Consequently, information of the push-type service which automatically delivers contents of registered channels is temporarily stored in the user's individual information memory means 4, and can be obtained for the first time only when the user's terminals $3a, 3b, \ldots, 3n$ access the server 1. Therefore, the server 1 with the user's individual information memory means 4 is able to provide a service that is intermediate between the pull-type service and the push-type service.

Information obtained by users is stored as user's individual information specific to the respective users into the user's individual information memory means 4 by the contents storage means 6. The contents storage means 6 also stores application programs stored in the pattern memory means 5 as user's individual information into the user's individual information memory means 4. If necessary, the accessing software can be customized to the preference of users by the contents customizing means 7. When users wish to use user's individual information stored in the user's individual information memory means 4, the contents usage control means 9 reads the user's individual information from the user's individual information memory means 4 in response to a usage request from the user's terminals $3a, 3b, \ldots, 3n$, and copies the user's individual information to the displayable/executable area $1a$. Specifically, if the user's individual information is static information, then the contents usage control means 9 copies the user's individual information to a display area of the displayable/executable area $1a$. If the user's individual information is dynamic program information, then the contents usage control means 9 copies the user's individual information to an executable area of the displayable/executable area $1a$. The server 1 permits the contents of the user's individual information thus copied to the displayable/executable area $1a$ to be displayed or permits the program of the user's individual information thus copied to the displayable/executable area $1a$ to be executed. If new user's individual information is generated as a result of the execution of the program, the contents storage means 6 stores the new user's individual information into the user's individual information memory means 4.

The present invention as it is applied to a WWW server on the Internet will be described below.

Figure 2:
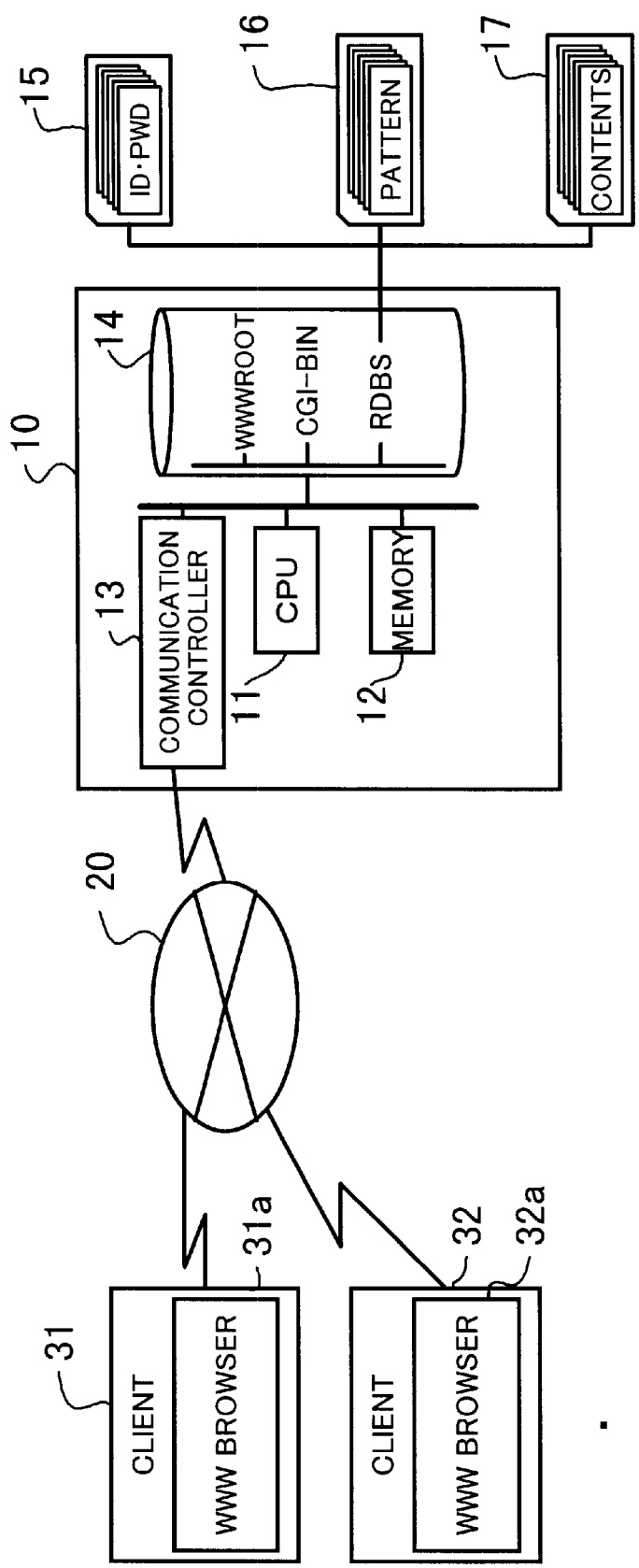
FIG. 2 is a block diagram of a WWW server on the Internet.

FIG. 2 shows in block form a WWW server on the Internet. In FIG. 2, it is assumed that a WWW server 10 is placed on the Internet. The WWW server 10 is connected through a public network 20 to a plurality of clients 31, 32, . . . , and functions as a provider which accesses the Internet. The clients 31, 32, . . . have respective WWW browsers 31a, 32a, . . . , respectively, each being general information browsing software, and do not need an external memory device such as a local hard disk. The WWW server 10 has a central processing unit (CPU) 11, a memory 12, a communication controller 13, and a hard disk 14. The hard disk 14 stores an operating system, various application programs, and an application executing and managing program. The WWW server 10 also has a directory "WSWROOT", for example, for storing files for the clients to view static information and a directory "CGI-BIN", for example, for storing files for the clients to view dynamic information, as areas of the hard disk 14. The hard disk 14 stores therein an application program of a relational database and data files thereof. The data files of the relational database include a user management file 15 for managing user's identifiers (ID) and passwords (PWD), a pattern registration file 16 for registering patterns of application programs prepared by the WWW server 10, and a user file 17 for storing user's personal application programs, their data, and contents of information offered by the WWW server 10 and other servers.

An example of an application program registered in the pattern registration file 16 will be described below. The registered application program is an HTML (Hypertext Markup Language) file written according to specifications of the HTML. The pattern registration file 16 also registers files of a dynamic HTML which are capable of expressing dynamic pages with an expanded version of the ordinary HTML. Files of the dynamic HTML comprise text data as is the case with the ordinary HTML, and also comprise executable programs. Because of these properties, application programs can be managed as text data.

A specific example of an application program will be described below.

Figure 3:
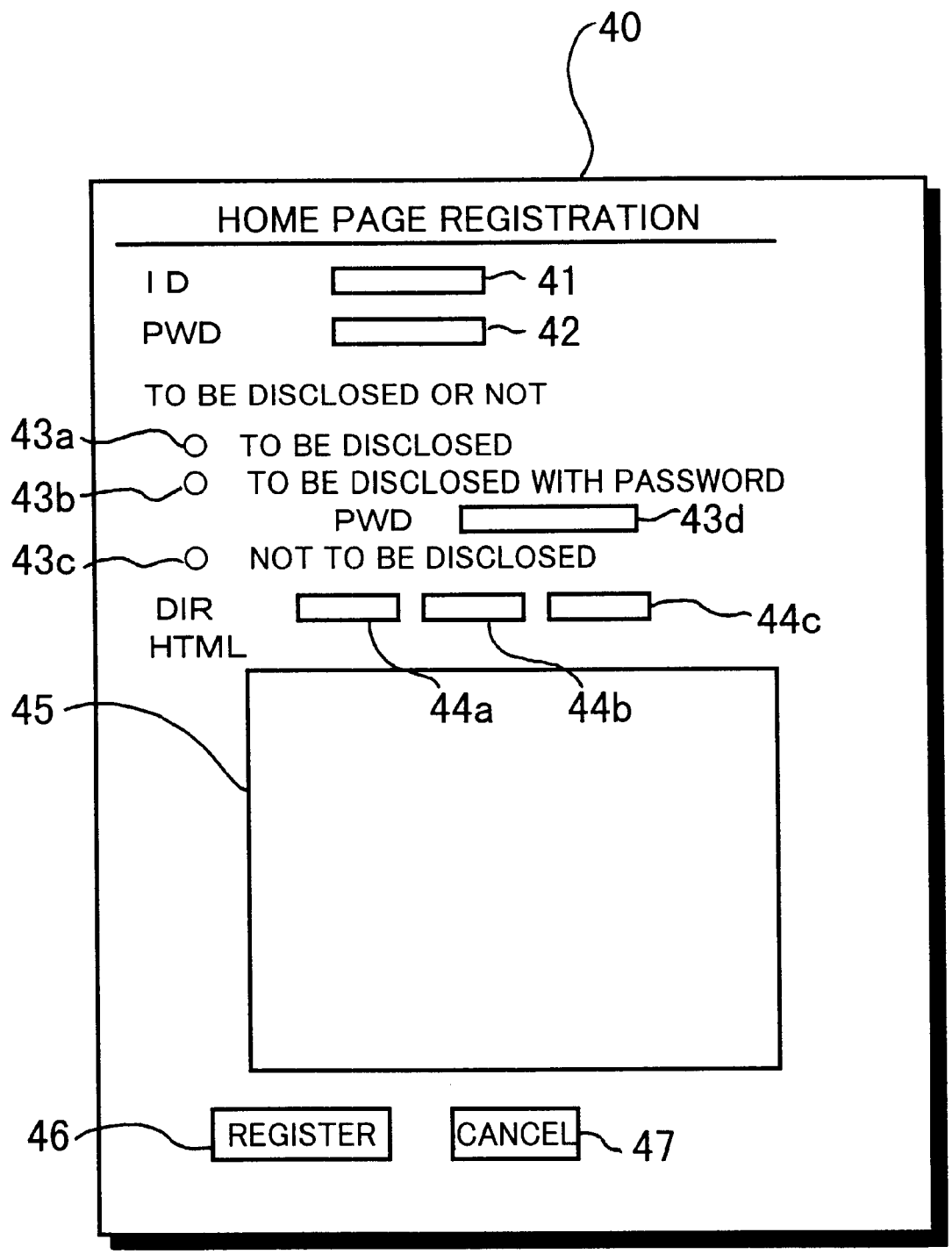
FIG. 3 is a diagram showing an executed example of a home page generating program.

FIG. 3 shows an executed example of a home page generating program. The home page generating program is stored in the hard disk 14 as part of the functions of an application executing and managing program. A displayed home page registering image 40 contains a text box 41 for entering a user's identifier (ID), a text box 42 for entering a user's password (PWD), three radio buttons 43a, 43b, 43c for selecting disclosure, disclosure with a user's password, and non-disclosure, respectively, a text box 43d for entering a user's password when disclosure with a user's password is selected, text boxes 44a, 44b, 44c for entering information to manage a generated home page in a hierarchical fashion, a text box 45 for use as a text editor for an HTML source, a button 46 for registering an edited HTML source, and a button 47 for canceling a registered HTML source. By clicking the button 46, data entered in the text boxes and data selected by the radio buttons are stored into user's individual storage areas of the user file 17, using user's identifiers and user's passwords as a key.

Figure 4:
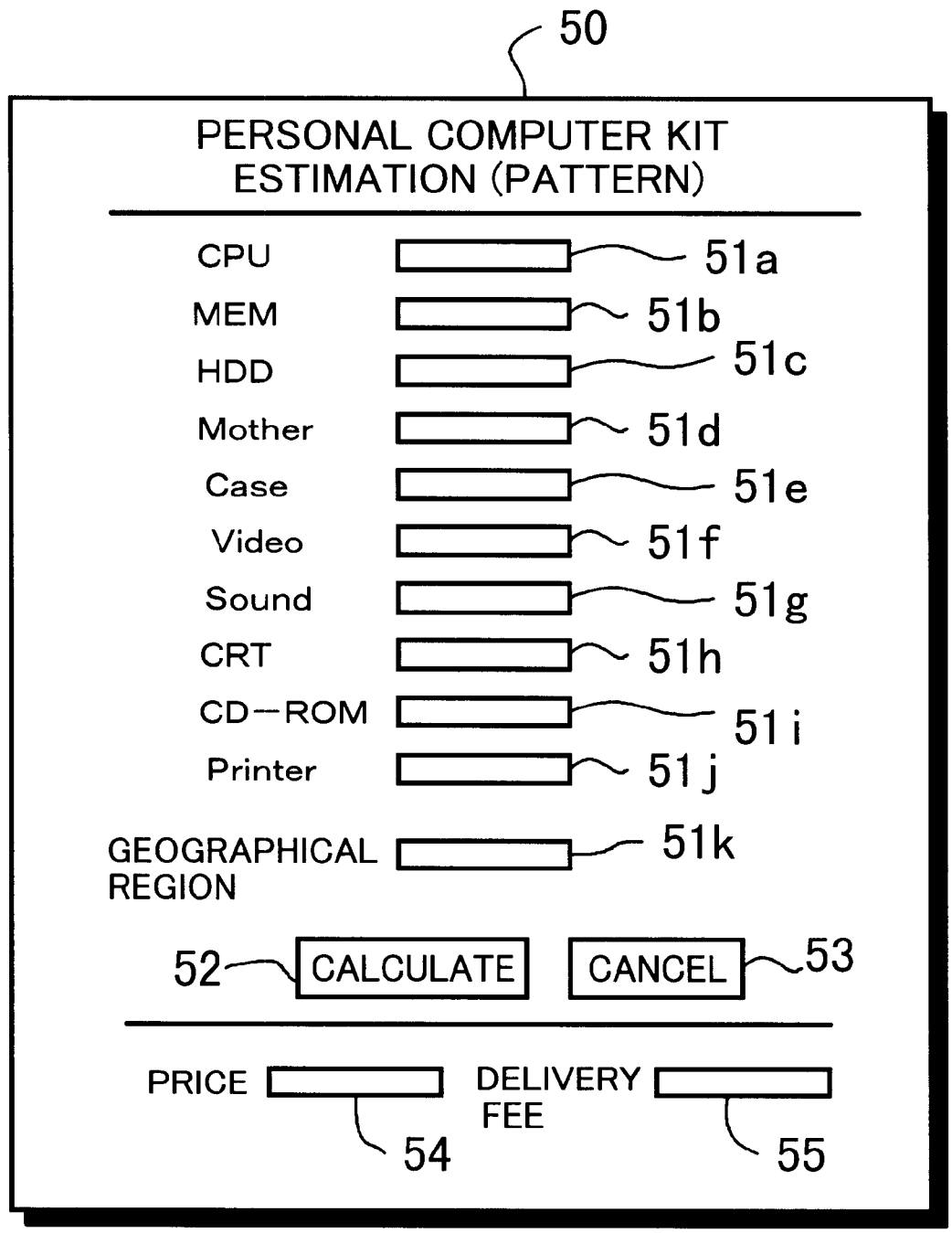
FIG. 4 is a diagram showing an executed example of an original application program.

FIG. 4 shows an executed example of an original application program. The illustrated original application program serves as an estimating system for estimating the price of a personal computer kit to be assembled. A pattern of the program is registered in the pattern registration file 16. When the stored pattern of the program as the estimating system is executed, an image 50 containing the names of components of the personal computer kit and corresponding text boxes for entering data is displayed. The displayed text boxes include a text box 51a for entering central processing unit (CPU), a text box 51b for entering the storage capacity of a memory, a text box 51c for entering the storage capacity of a hard disk, a text box 51d for entering the type of a motherboard, a text box 51e for entering the type of a case, a text box 51f for entering the type of a video board, a text box 51g for entering the type of a sound board, a text box 51h for entering the type of a display monitor, a text box 51i for entering the type of a CD-ROM driver, a text box 51j for entering the type of a printer, and a text box 51k for entering the geographical region of an applicant. The image 50 also contains a calculation button 52, a cancelation button 53, and boxes 54, 55 for displaying an estimated price and a delivery fee, respectively. The user may read the data of the program as the estimating system from the pattern registration file 16, customize the data, and store the customized data into a storage area of the user file 17, using the user's identifier and password as a key. The data may be customized by modifying the title, the names of components, and the number of components in text data of the pattern which are described in the HTML format.

Figure 5:
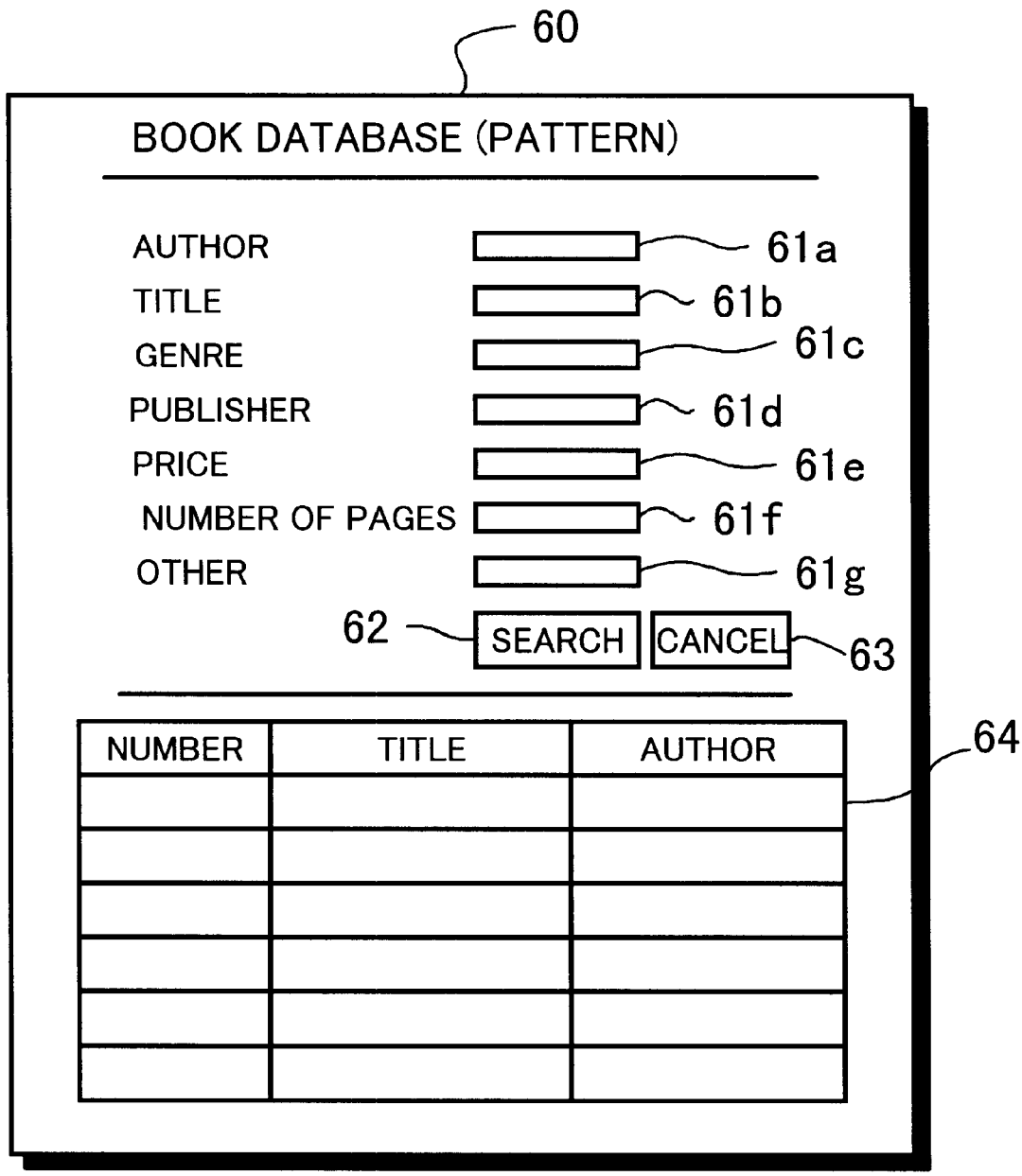
FIG. 5 is a diagram showing an executed example of an original database program.

FIG. 5 shows an executed example of an original database program. A book database is illustrated as a pattern of such an original database program. When the pattern of the original database program is executed, an image 60 is displayed which contains text boxes for entering search conditions. The text boxes include a text box 61a for entering an author, a text box 61b for entering a title, a text box 61c for entering a genre, a text box 61d for entering a publisher, a text box 61e for entering a price, a text box 61f for entering the number of pages, and a text box 61g for entering another condition. The image 60 also contains a button 62 for starting a book search, a button 63 for canceling a book search, and a table 64 for displaying the result of a book search. The user may read the data of the program of the book database from the pattern registration file 16, customize the data, and store the customized data into a storage area of the user file 17, using the user's identifier and password as a key. The data may be customized by modifying the title, the names of search conditions, and the number of conditions in text data of the pattern which are described in the HTML format.

FIG. 6 shows an executed example of an original agent program. An airplane seat availability search is illustrated as a pattern of such an original agent program. When the pattern of the original agent program is executed, an image 70 is displayed which contains text boxes for entering search conditions. The text boxes include a text box 71a for entering a date, a text box 71b for entering a time (hours only), a text box 71c for entering an origin, a text box 71d for entering a destination, a text box 71e for entering an airline, a text box 71f for entering a nonsmoking seat selection, and a text box 71g for entering a seat type. The image 70 also contains a button 72 for starting a seat availability search, a button 73 for canceling a seat availability search, and a table 74 for displaying the result of a seat availability search. The user may read the data of the program of the airplane seat availability search from the pattern registration file 16, customize the data, and store the customized data into a storage area of the user file 17, using the user's identifier and password as a key. The data may be customized by modifying the title, the address of a searching site, the names of search conditions, and the number of conditions in text data of the pattern which are described in the HTML format.

The data structure of the user file 17 as a database for storing application programs specific to the users will be described below.

FIG. 7 shows the data structure of the user file 17. As shown in FIG. 7, the user file 17 has a table-type data structure including a column 81 of user's identifiers (ID), a column 82 of user's passwords (PWD), a column 83 of service identifiers (SID), a column 84 of data types, a column 85 of serial numbers, a column 86 of disclosure flags, a plurality of columns 87a~87c of directory information for hierarchical management, and a column 88 of contents.

If the contents are a home page, then a service identifier "HP" is entered, and if the contents are an application program, then a service identifier "APP" is entered. If the contents are a program source, then a data type "SRC" is entered, and if the contents are data, then a data type "DAT" is entered. If the contents can be disclosed, then a disclosure flag "1" is entered, if the contents can be disclosed with a password, then a disclosure flag "2" is entered, and if the contents cannot be disclosed, then a disclosure flag "3" is entered. Since up to three types of directory information can be designated in this example, the contents can be managed in three hierarchical levels or groups. If the contents are a home page, then they are HTML source data, if the contents are a program, then they are HTML program source data, and if the contents are data, then they are text data. If the contents contains a plurality of values as data, they are stored as data in a csv (comma separated value) format. A password for use when a disclosure flag indicates the disclosure of contents with a password is stored as a second password in the user management file 15.

If a user registers contents, one record is generated with at least a user's identifier and password, and stored in the user file 17. If data is generated when an application program is executed, then contents with the data type "DAT" are generated using a user's identifier and password which have that application program, and stored in the user file 17. If contents stored in the user file 17 are to be used, the user file 17 is searched for a record of desired contents, using a user's identifier and password as a key. The user file 17 may be searched for such a record, using an SQL (Structured Query Language) which is a database query language. Use of the SQL makes it possible to insert, update, and delete a record as well as to search the user file 17 for a record.

An example in which a user generates an application will be described below. First, the user accesses the WWW server 10 from a client, and a menu program which has been prepared by the server supervisor in the directory "WWWROOT" that is a displayable area, for example, in the hard disk 14 is executed.

FIGS. 8(A) and 8(B) are illustrative of displayed menus. Specifically, FIG. 8(A) shows a displayed initial menu, and FIG. 8(B) shows a displayed submenu. As shown in FIG. 8(A), an initial menu 90 has a text box 91 for entering a user's identifier (ID), a text box 92 for entering a user's password (PWD), a generation button 93 for indicating the generation of an application, and a use button 94 for indicating usage of the application. The user enters its own identifier into the text box 91, and its own password into the text box 92. Then, the user presses the generation button 93, whereupon a submenu 95 shown in FIG. 8(B) is displayed. The displayed submenu 95 contains "HOME PAGE", "APPLICATION", "DATABASE", and "AGENT". If the user selects "HOME PAGE", then the user can generate and register its own home page. If the user selects "APPLICATION", "DATABASE", or "AGENT", then the user can customize a corresponding pattern application program to suit its own needs, and register the customized application program. For using a user's individual program thus registered, the user presses the use button 94 in the initial menu 90, whereupon a menu which is the same as the submenu 95 shown in FIG. 8(B) is displayed.

Figure 9:
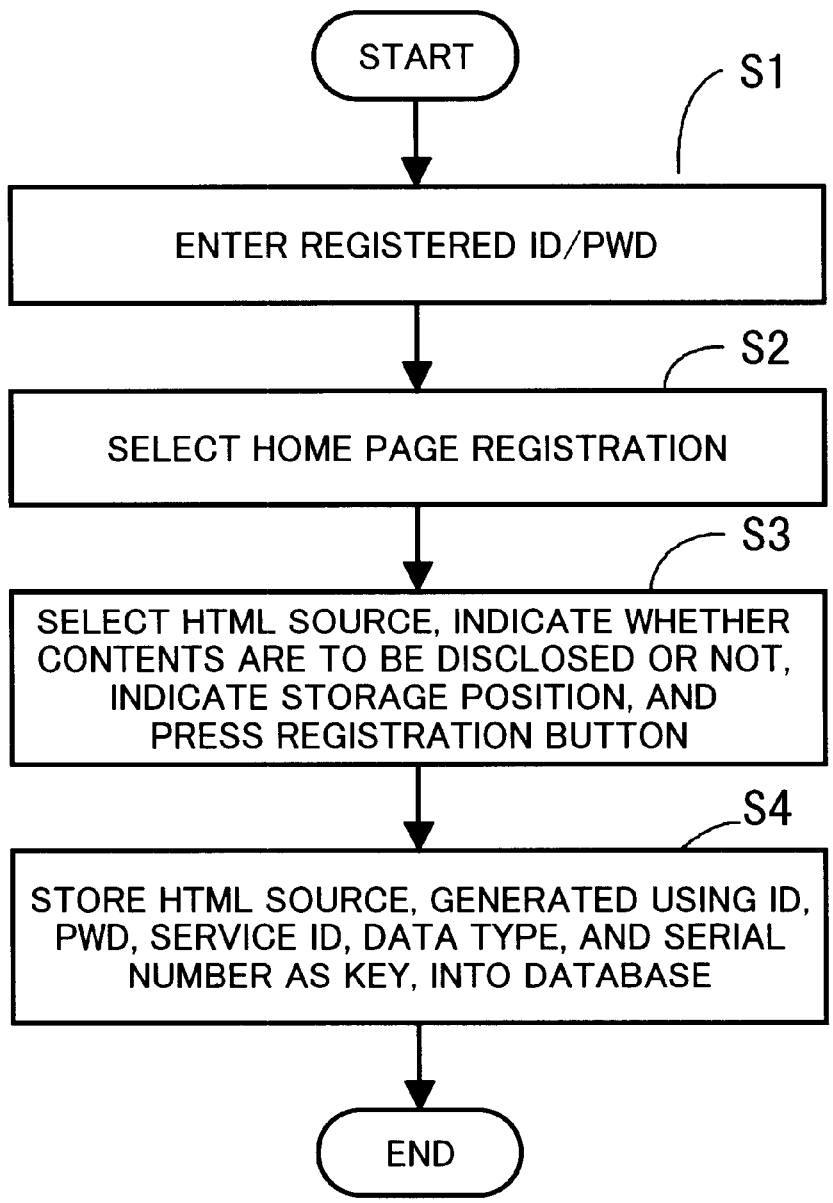
FIG. 9 is a flowchart of a home page generating sequence.

FIG. 9 illustrates a home page generating sequence. When the user is to generate its own home page, the user enters the user's identifier and password, which have already been registered with the initial menu 90, and then press the generation button 93 in a step S1. Then, the user selects "HOME PAGE REGISTRATION", whereupon a home page registration image as shown in FIG. 3 is displayed in a step S2. In the displayed home page registration image, the user enters an HTML source in the text box 45, indicates whether contents are to be disclosed or not, enters a storage position in one of the text boxes for entering directory information, and then presses the registration button 46 in a step S3. Thereafter, a database record is generated using the user's identifier, the user's password, the service identifier, the data type, and the serial number as a key, and the HTML source generated in the home page registration image is stored in the user file 17 in a step S4. If necessary, information as to whether contents are to be disclosed or not is entered in the column of disclosure flags of the same record, and information for hierarchical management is entered in the column of directory information. The registered home page is now placed under the management of the user. While the generation of a new home page has been described above, the user can also read an existing home page, correct the home page, and then register the corrected home page. In this connection, if there is a home page contained in the user's individual information, then a menu for correcting a home page is added to the submenu 95 when it is displayed. Therefore, the menu for correcting a home page may be selected to correct an existing home page.

FIG. 10 shows an example of a home page registered in a database. When the registration of a home page is completed, a record using the user's identifier, the user's password, the service identifier, the data type, and the serial number as a key is added to the user file 17. In the example shown in FIG. 10, "A" is entered in the column 81 of user's identifiers, a certain value "* * * *" in the column 82 of user's passwords (PWD), "HP" in the column 83 of service identifiers (SID), "SRC" in the column 84 of data types, "1" in the column 85 of serial numbers, "1" in the column 86 of disclosure flags, "X" in the column 87a of directory information, and the HTML source of the generated home page in the column 88 of contents. If a generated home page is to be corrected, the user searches the user file 17 using the user's identifier, password, and service identifier as a key to display a list of home pages which have been generated by the user and then selects the home page to be corrected to read the home page into the home page registration image.

Generation of an application program using a pattern and registration of the generated application program will be described below. For generating an application program, the user enters the user's identifier and password in the initial menu 90 shown in FIG. 8(A), and then presses the generation button 93. In the displayed submenu 95, the user selects "ESTIMATING SYSTEM" registered in the pattern registration file 16 as a pattern of "APPLICATION". The "ESTIMATING SYSTEM" represents, for example, the estimating system for estimating the price of a personal computer kit to be assembled, as shown in FIG. 4.

Figure 11:
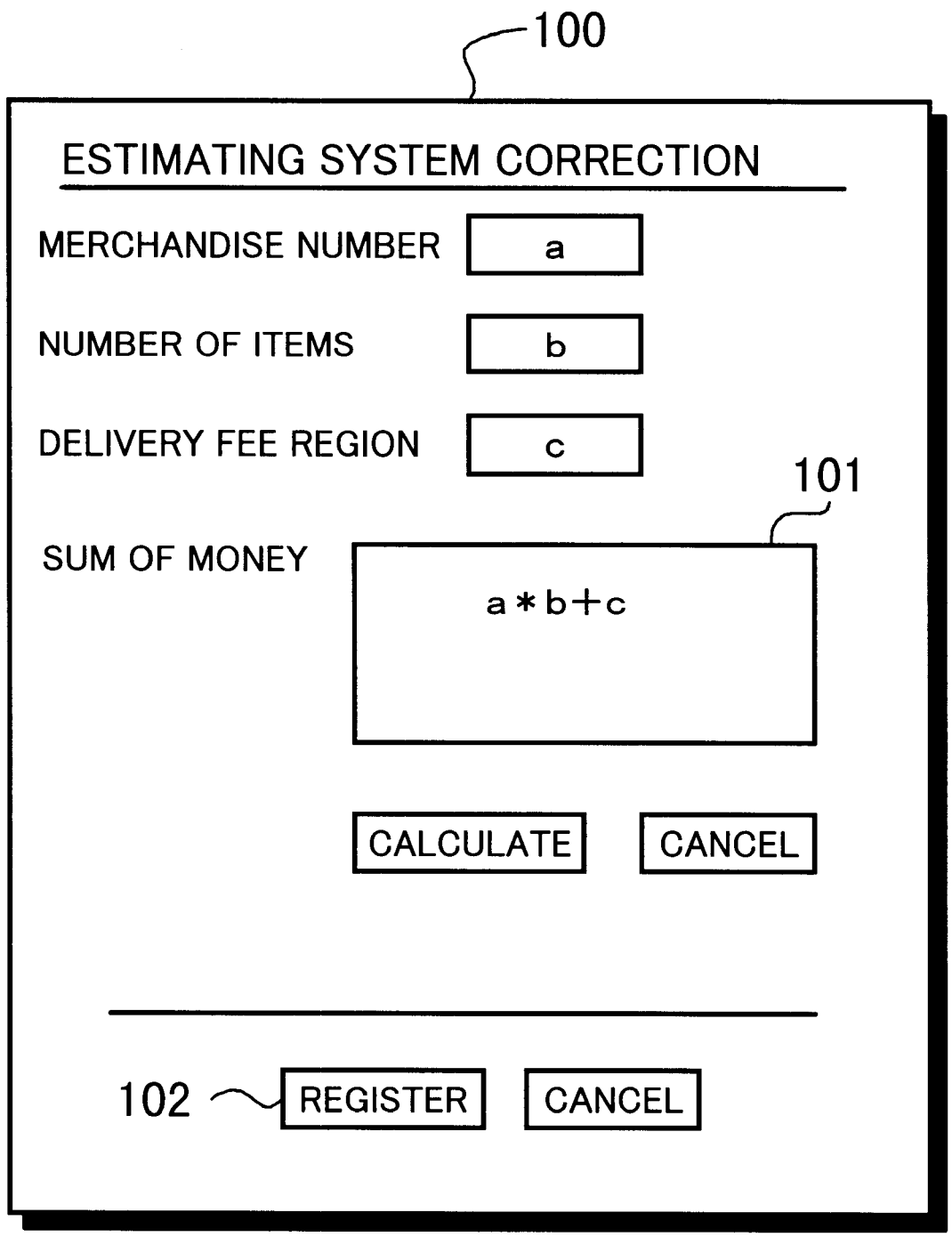
FIG. 11 is a diagram of a customized example of an estimating system.

FIG. 11 shows a customized example of the estimating system. When the user selects "ESTIMATING SYSTEM" in the submenu 95, an image 100 for correcting the estimating system is displayed, and the program of the estimating system for estimating the price of a personal computer kit to be assembled is read and displayed. The user corrects the names of displayed items and their displayed positions, and also corrects positions and sizes of text boxes for entering data in columns. In the example shown in FIG. 11, a formula for calculating entered item values is established in a column 101 of a sum of money. When the user then presses a registration button 102, the corrected program of the estimating system thus customized according to the needs of the user is registered as a user's individual application program in the user file 17. A procedure up to the registration of the estimating system will be described below.

Figure 12:
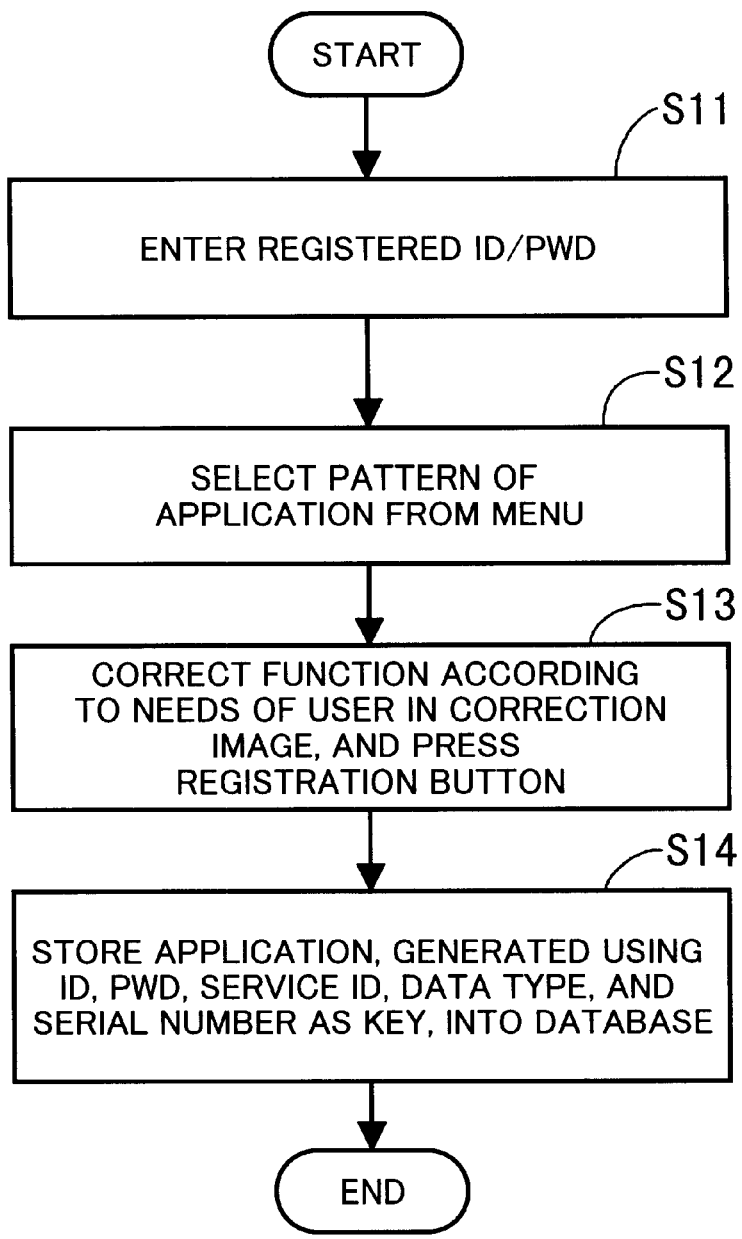
FIG. 12 is a flowchart of an application generating sequence.

FIG. 12 illustrates an application generating sequence. When the user is to generate an original application of its own, the user enters the user's identifier and password, which have already been registered with the initial menu 90, and then press the generation button 93 in a step S11. Then, the user selects "ESTIMATING SYSTEM" of "APPLICATION" in the submenu 95, whereupon the pattern program of the estimating system is read, and the image 100 for correcting the estimating system is displayed, and the image for estimating the price of a personal computer kit to be assembled as shown in FIG. 4 is displayed in a step S12. In the image 100, the user corrects the function of the estimating system such as names of items according to his needs, and presses the registration button 102 in a step S13. Then, a database record is generated using the user's identifier, the user's password, the service identifier, the data type, and the serial number as a key, and the program source generated in the image 100 for correcting the estimating system is stored in the user file 17 in a step S14. Information indicative of nondisclosure is automatically entered in the column of disclosure flags, and the column of directory information is not used. The registered estimating system is now placed under the supervision of the user, with such a limitation that it can be used individually by the user. If there is an estimating system generated by the user when the submenu 95 is displayed next time, therefore, a menu of "ESTIMATING SYSTEM CORRECTION" is added to "APPLICATION" in the submenu 95. Using the menu of "ESTIMATING SYSTEM CORRECTION", the user can thus read the generated estimating system into the image for correcting the estimating system and correct the generated estimating system.

FIG. 13 shows an example of an original application registered in the database. When the registration of the estimating system from the image for correcting the estimating system is completed, a record using the user's identifier, the user's password, the service identifier, the data type, and the serial number as a key is added to the user file 17. In the example shown in FIG. 13, "A" is entered in the column 81 of user's identifiers, a certain value "* * * *" in the column 82 of user's passwords (PWD), "APP" in the column 83 of service identifiers (SID), "SRC" in the column 84 of data types, "1" in the column 85 of serial numbers, "3" in the column 86 of disclosure flags, and the program source of the generated estimating system in the column 88 of contents.

Use of home pages registered individually by respective users will be described below. It is assumed that home pages of three users are registered in the user file 17. A registered example of home pages will be described below.

FIG. 14 shows an example of home pages registered in the database. In the example shown in FIG. 14, two home pages of the user with the user's identifier A are registered, one being not to be disclosed and one to be disclosed. A home page of the user with the user's identifier B is registered, which is to be disclosed with a password. A home page of the user with the user's identifier C is registered, which is to be disclosed. For using the registered home pages, the column 83 of service identifiers (SID) and the column 86 of disclosure flags are searched.

Figure 8:
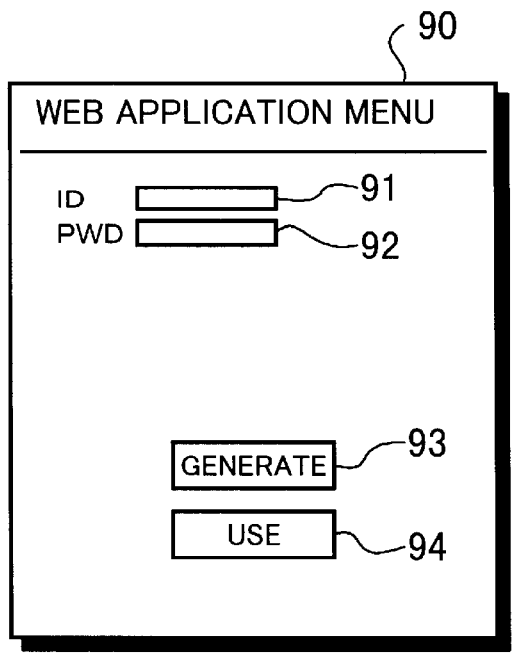
FIG. 8(A) is a diagram showing a displayed initial menu by way of example.
FIG. 8(B) is a diagram showing a displayed submenu by way of example.
Figure 8:
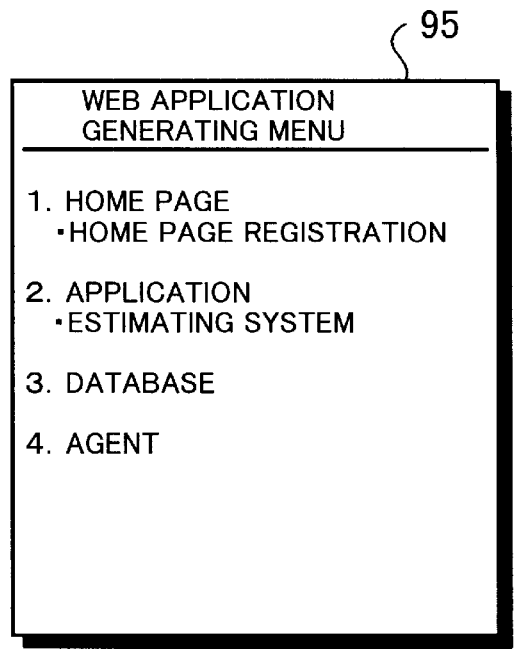

For using a registered home page, the user presses the use button 94 in the initial menu 90 shown in FIG. 8. A submenu (not shown) for using applications is displayed, and the user selects a list of home pages, displaying a list of home pages which have been registered and can be disclosed. When the user selects a home page which the user wants to use from the displayed list of home pages, the user can use the selected home page. In the example shown in FIG. 14, when the user selects a list of home pages, those records whose service identifiers (SID) are "HP" and whose disclosure flag is "1" or "2" are selected, and the names of the users of the selected records are displayed in the list of home ages. When the user selects a home page from the list of home pages, the HTML source is read from the record of the selected home page, using the menu information of the selected home page as a key, and copied to the displayable area of the WWW server 10, making it possible to display the selected home page.

Figure 15A:
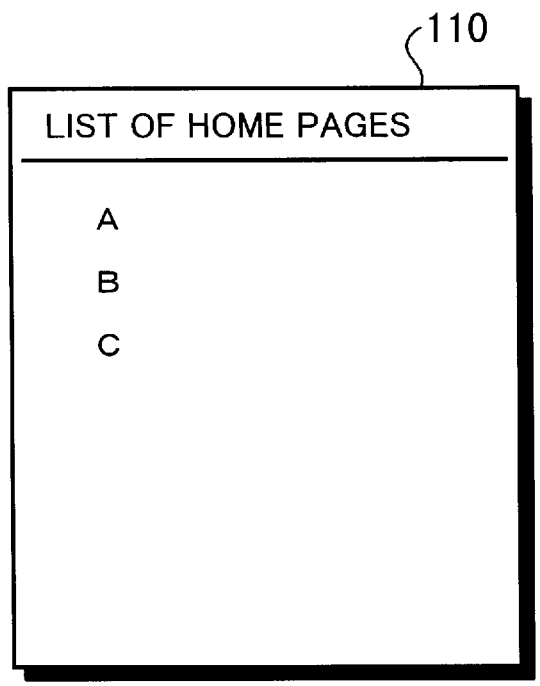
FIG. 15(A) is a diagram of a displayed example of a list of home pages for the user to use.
Figure 15B:
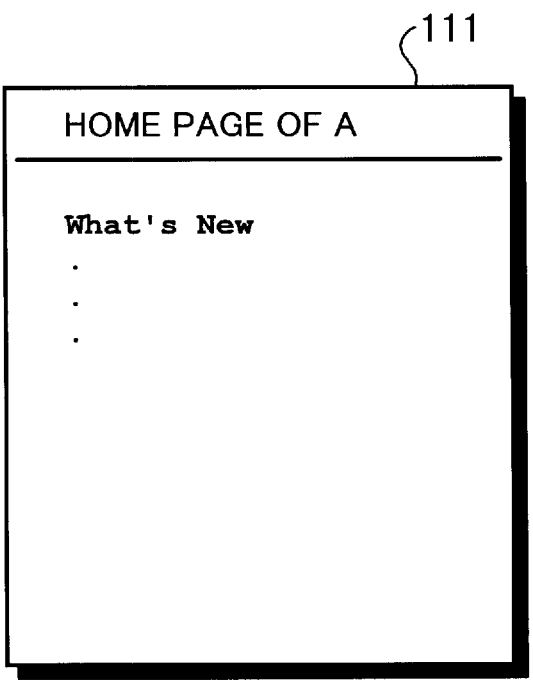
FIG. 15(B) is a diagram of a displayed example of a home page that is selected for the user to use.

FIGS. 15(A) and 15(B) show a transition that occurs between displayed images when the user is to use a home page. Specifically, FIG. 15(A) illustrates a displayed example of a list of home pages for the user to use, and FIG. 15(B) illustrates a displayed example of a home page that is selected for the user to use. When the user selects a list of home pages from the submenu to use an application, a list 110 of home pages that can be disclosed is displayed as shown in FIG. 15(A). In FIG. 15(A), three names which have been indicated so as to be disclosed or disclosed with a password upon registration are displayed. If the user selects "A", for example, then the HTML source of a home page is read from the user file 17 based on the information of the selected name, and a home page 111 of "A" is displayed as shown in FIG. 15(B). A procedure for using the home page will be described below.

Figure 16:
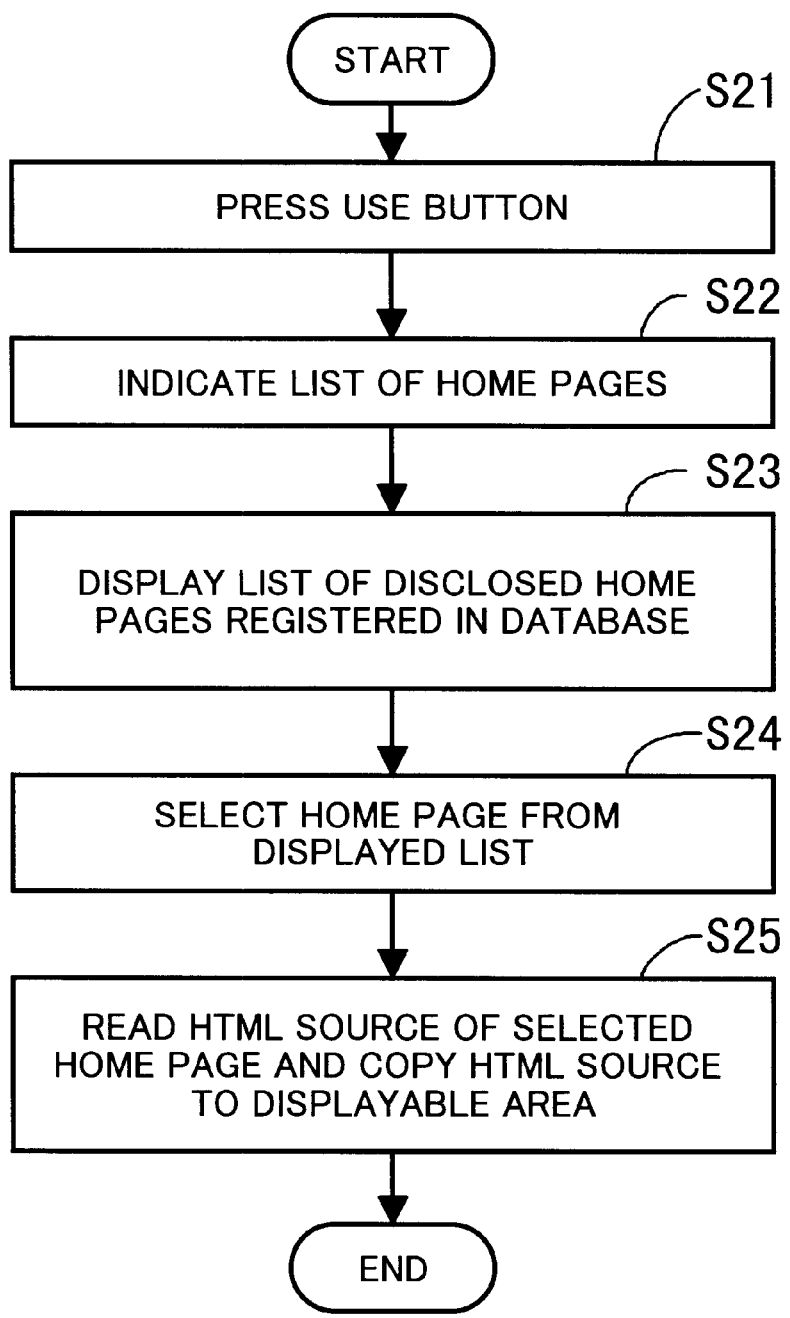
FIG. 16 is a flowchart of a sequence of using registered home pages.

FIG. 16 shows a sequence of using registered home pages. When accessed by the client, the initial menu 90 is displayed. When the client then presses the use button 94, the sequence of using registered home pages is started in a step S21. Then, the user selects a list of home pages from the submenu to use an application in a step S22. The application executing and managing program searches the user file 17 of the database using the service identifier (SID) and the disclosure flag as a key, extracting corresponding records, and displays the names of users corresponding to user's identifiers of the records in a list of home pages in a step S23. When the client selects a home page that it wants to use from the displayed list of home pages in a step S24, the application executing and managing program reads the HTML source of the selected home page from the information that has been used to display the list of home pages, and copies the HTML source to the directory "WWWROOT" that is a displayable area indicated by the WWW server 10 in a step S25. The selected home page can now be browsed by the WWW browser of the accessing client. Since only the home page is displayed and no new data is generated, the contents of the database remain unchanged.

Use of an original application which a user has generated will be described below. In order for a user to use an estimating system which the user has generated on its own, the user enters its own user's identifier and password in the initial menu 90 shown in FIG. 8(A) and then presses the use button 94. A submenu to use an application is then displayed, displaying a list of generated applications which have been registered by the user. When the user selects the estimating system from the displayed list, the program source of the estimating system is read from the user file 17 of the database, copied to the executable area of the WWW server 10, and then executed.

Figure 17:
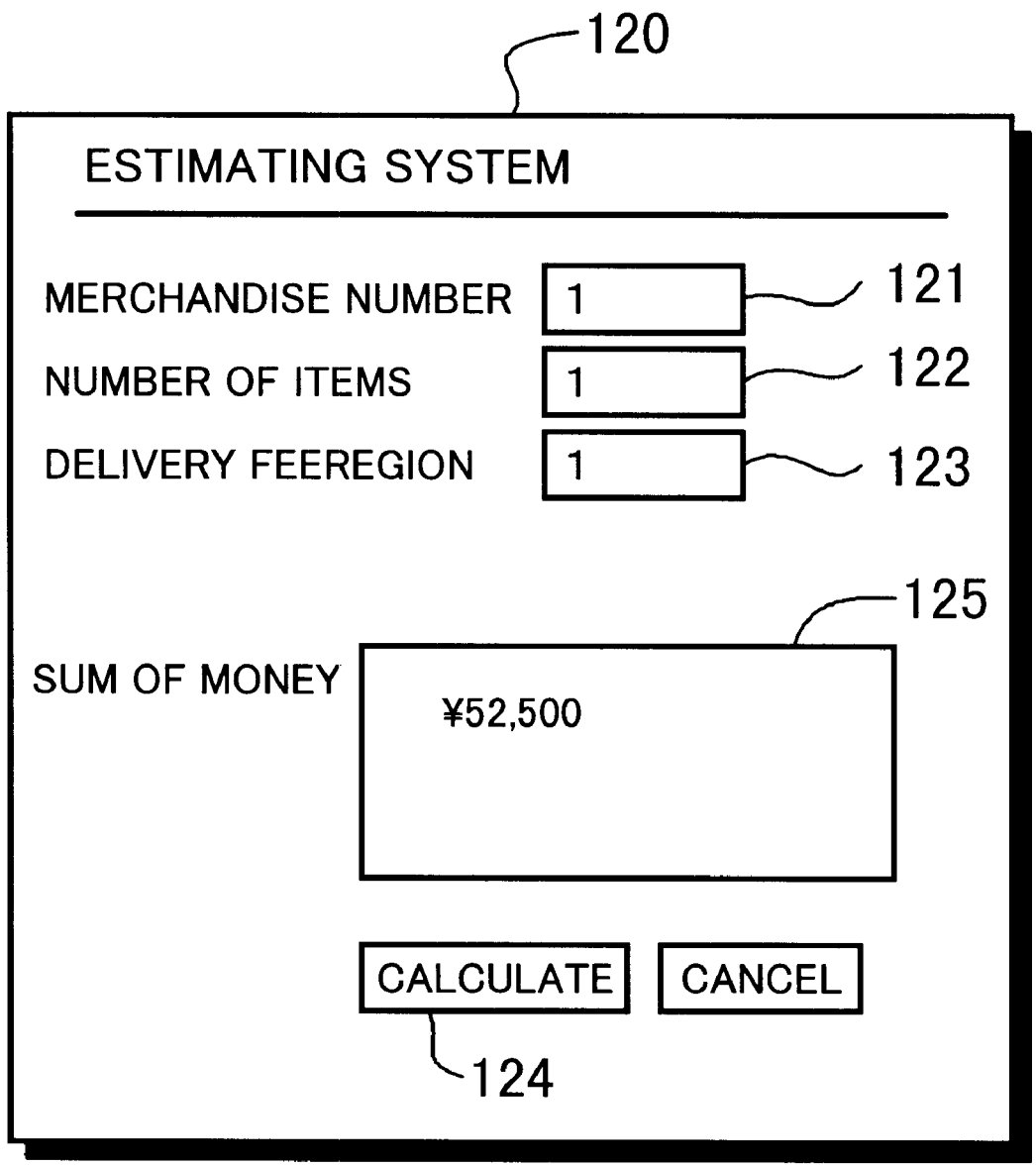
FIG. 17 is a diagram showing a displayed example of an executed application to be used.

FIG. 17 shows a displayed example of an executed application to be used. When the estimating system is selected from the submenu to use an application, the program of the estimating system is copied to the executable area indicated by the WWW server 10, and then executed, displaying an image 120 of the estimating system which reflects any customized contents. The user enters data in text boxes 121~123 for data entry items, and then presses a calculation button 124, whereupon a calculation is made according to a formula established in a column 125 of a sum of money. A calculated result is then displayed in the column 125. When the program of the estimating system is executed, data representing the entered values and the calculated value are newly generated. Since the newly generated data represent information specific to the user, the data are additionally stored in the user file 17 of the database. A registered example of these new data will be described below.

FIG. 18 shows an example of new data registered in the database. In the example shown in FIG. 18, a first line of data represents a record of the application program of the estimating system, and a second line of data represents data generated when the estimating system is used. The generated data contain a user's identifier (ID), a user's password (PWD), a service identifier (SID), and a disclosure flag whose values are identical to those of the application program of the estimating system. However, the generated data contain a data type which is "DAT". Newly generated data, i.e., entered values and a calculated value, are stored in a csv format in the column 88 of contents. A procedure for using the application of the estimating system will be described below.

Figure 19:
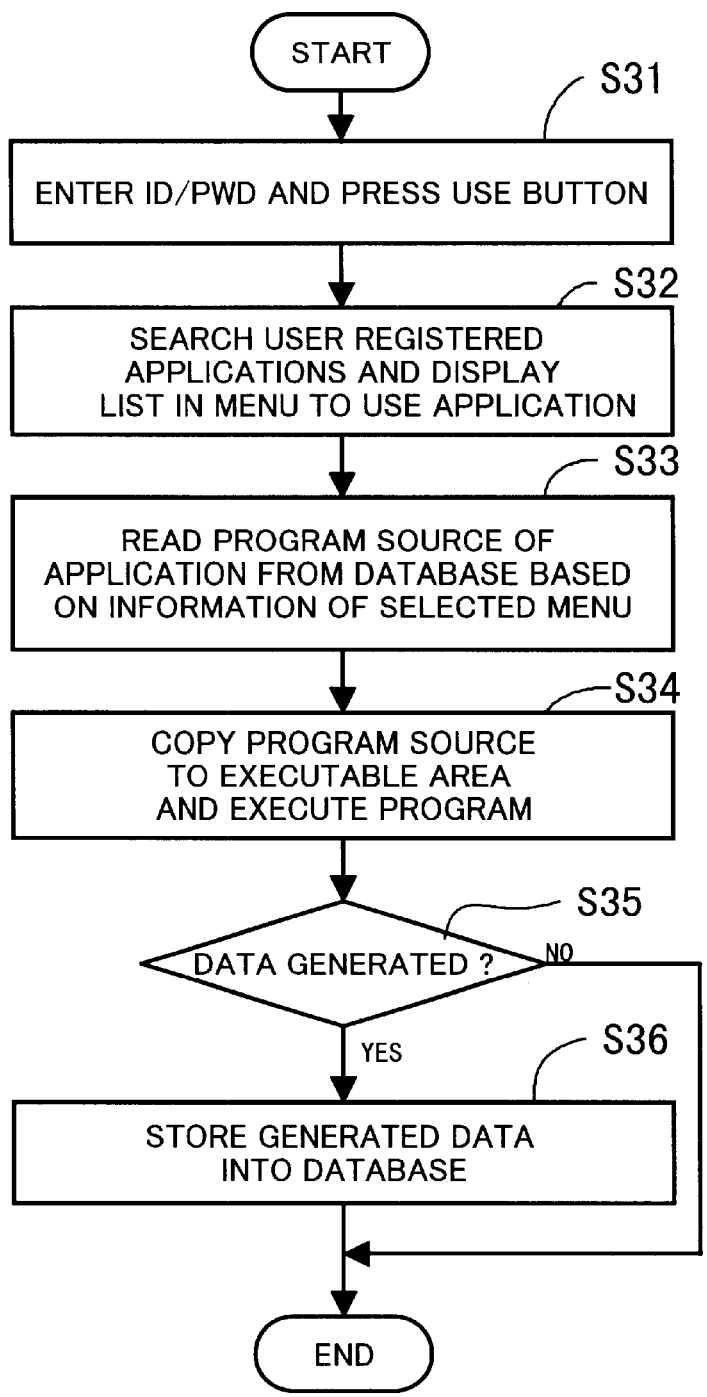
FIG. 19 is a flowchart of a sequence of using a registered application.

FIG. 19 shows a sequence of using a registered application. When accessed by the client, the initial menu 90 is displayed. The client enters the user's identifier and password, and then presses the use button 94 in a step S31. The application executing and managing program searches the user file 17 of the database using the entered user's identifier, password and the service identifier as a key, displaying a list of registered applications of the accessing user in the submenu to use an application in a step S32. When the user selects the estimating system from the displayed list, the application executing and managing program searches the user file 17 of the database using information of the menu selected in the displayed list as a key, and reads the program source from the column of contents of the corresponding record in a step S33. Then, the application executing and managing program copies the program source of the estimating system read from the user file 17 to the executable area of the WWW server 10, and executes the program source in a step S34. The application executing and managing program thereafter checks if data are generated or not when the application is used in a step S35. If data are newly generated, then the application executing and managing program stores a record having the generated data as contents, together with the user's identifier, the user's password, the service identifier, the data type, and the serial number, into the user file 17 of the database in a step S36. When the application executing and managing program determines that the execution of the program of the estimating system comes to an end, the application executing and managing program deletes the program from the executable area.

While the preferred embodiments of the present invention have been described above, the present invention is not limited to the illustrated embodiments, but may be embodied otherwise. For example, the user's terminals which have been described as portable terminals free of hard disks may be fixed terminals. The user's terminals may comprise terminals having large-capacity hard disks. The information providing apparatus according to the present invention may be used in a server of an intranet.

In the illustrated embodiments, all user's individual information is stored in the single user file 17. However, user's individual information may be managed in different databases depending on the service identifier or the data type.

According to the present invention, as described above, user's individual information is carried by a server. Therefore, a user can extract desired information, which has been selected and edited for itself, at an arbitrary time. The client can thus obtain information with general information browsing software which does not require plug-in software and special software. User terminals for using data that are provided are not limited to particular types.

Since the server receives and stores user's individual information for users, information that takes a user a long time to obtain can be generated in advance. As user's terminals do not need a storage area for storing individually provided information, portable terminals free of hard disks may be used as the user's terminals.

Users can customize applications that are provided in order to suit the manner in which they use the applications, and store the customized applications as user's individual information in the server. Consequently, it is not necessary to download application programs to the user's terminals. Applications can be managed easily and security can be established easily because key information can be included in user's individual information.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A server connected to user terminals, the server comprising:

a memory having a plurality of user individual memories assigned to each user, each of said user's individual memory storing user information, including program patterns, used by the user, wherein the user's individual memory serves as an external memory device of the user's terminal;

content storage means for storing the user information into a user's individual memory;

managing information manipulating means for establishing user management information, which comprises user identification and password information, and for associating the user information, which is stored into the user's individual memory by said contents storage means, with the user management information;

content usage control means for reading and processing for the user the user information stored in the user's individual memory according to the user management information; and contents customizing means for modifying or generating the user information depending on the manner in which the user uses the user information.

2. A server according to claim 1, wherein said contents usage control means comprises means for reading the user information from a user's individual memory and copying the read user information to a displayable/executable area to place the user information under the management of the server, for using the user information.

3. The server according to claim 1, wherein a user's individual memory includes programs for managing the user information together with at least the user identification and password information in a database.

4. The server according to claim 1, wherein said user management information includes a service identifier and a database type.

5. The server according to claim 1, wherein said user management information includes a flag indicating whether the user identification and password information is to be disclosed or not.

6. The server according to claim 1, wherein said user management information includes directory information.

7. A computable-readable recording medium storing an information providing program for a server, for controlling a computer to function as a user's individual memory storing therein user's individual information in areas assigned respectively to the users, content storage program storing information into the user's individual memory, contents usage control means for reading the information stored in said user's individual memory and using the read information, pattern memory means for storing a pattern application program for use as a user's individual application program which can be read by a user and stored as user's individual information into said user's individual memory by said content storage program, and contents customizing program for modifying or newly generating the user's individual information depending on the manner in which a user uses the user's individual information, said content storage program including a managing information manipulating program establishing user management information, including user identification and password information, to manage the user's individual information for the user when the user's individual information is stored into said user's individual memory by said content storage program.

8. A system comprising:
   a plurality of terminals for use by a plurality of users; and
   a server connected to the plurality of terminals, said server comprising:
      a storage unit having a plurality of areas, each user being assigned an area, wherein the user's assigned area serves as an external memory device of a terminal for use by a user; and
      a processor that performs the following functions:
         storing user information into the area assigned to the user;
         establishing user management information, which comprises user identification and password information, to manage the user information for the user when the user information is stored in the area assigned to the user;
         retrieving the user information for the user upon demand by the user and when the user information is a program loading the program to be executed for the user; and
         modifying or generating the user information depending on the manner in which the user uses the user information.

9. A server responsible for serving a plurality of terminals of users, the server comprising:
   a storage unit having a plurality of areas, each user being assigned an area for storing user information, including program patterns, used by the user, wherein the user's assigned area serves as an external memory device of the user's terminal;
   a content storage function that receives information, including push information and application programs, on behalf of the user and stores the received information as the user information into the user's area on the storage unit;
   a managing information manipulating function for establishing user management information, which comprises user identification and password information, to manage the user information for the user when the user information is stored into the user's area on the storage unit; and
   a content usage control function that serves the user information to the user and when the requested information is an application program loading the application program for execution; and
   a content customizing function modifying or generating the user information depending on the manner in which the user uses the user information.

* * * * *